(12) United States Patent
Sutera

(10) Patent No.: US 7,721,011 B1
(45) Date of Patent: May 18, 2010

(54) METHOD AND APPARATUS FOR REORDERING MEMORY ACCESSES TO REDUCE POWER CONSUMPTION IN COMPUTER SYSTEMS

(75) Inventor: Massimo Sutera, Sunnyvale, CA (US)

(73) Assignee: Oracle America, Inc., Santa Clara, CA (US)

( * ) Notice: Subject to any disclaimer, the term of this patent is extended or adjusted under 35 U.S.C. 154(b) by 1082 days.

(21) Appl. No.: 11/124,848

(22) Filed: May 9, 2005

(51) Int. Cl.
*G06F 3/00* (2006.01)
*G06F 9/26* (2006.01)
*G06F 21/00* (2006.01)
*G06F 5/00* (2006.01)
*G06F 13/00* (2006.01)

(52) U.S. Cl. ............... 710/6; 710/5; 710/54; 711/5; 711/154; 711/158; 711/220

(58) Field of Classification Search .......... 710/6, 710/5, 54; 711/5, 220, 154, 158
See application file for complete search history.

(56) References Cited

U.S. PATENT DOCUMENTS

| | | | | |
|---|---|---|---|---|
| 5,644,786 A * | 7/1997 | Gallagher et al. | ............. | 710/30 |
| 5,860,104 A * | 1/1999 | Witt et al. | ............. | 711/137 |
| 6,108,769 A * | 8/2000 | Chinnakonda et al. | ............. | 712/216 |
| 6,182,177 B1 * | 1/2001 | Harriman | ............. | 710/112 |
| 6,209,067 B1 * | 3/2001 | Collins et al. | ............. | 711/158 |
| 6,212,589 B1 * | 4/2001 | Hayek et al. | ............. | 710/119 |
| 6,295,586 B1 | 9/2001 | Novak et al. | ............. | 711/154 |
| 6,571,325 B1 | 5/2003 | Satagopan et al. | ............. | 711/169 |
| 6,628,292 B1 * | 9/2003 | Ashburn et al. | ............. | 345/565 |
| 6,854,025 B2 * | 2/2005 | Knight et al. | ............. | 710/22 |
| 6,922,770 B2 | 7/2005 | Shanmugasundaram et al. | ............. | 711/209 |
| 6,941,428 B2 | 9/2005 | Carr | ............. | 711/158 |
| 2003/0061458 A1 * | 3/2003 | Wilcox et al. | ............. | 711/167 |
| 2003/0070052 A1 | 4/2003 | Lai | ............. | 711/169 |
| 2003/0177320 A1 * | 9/2003 | Sah et al. | ............. | 711/158 |
| 2004/0030794 A1 | 2/2004 | Hugly et al. | ............. | 709/230 |
| 2004/0030816 A1 * | 2/2004 | Knight et al. | ............. | 710/52 |
| 2004/0183795 A1 | 9/2004 | Deering et al. | ............. | 345/419 |
| 2004/0199739 A1 | 10/2004 | Jeddeloh | ............. | 711/169 |
| 2004/0243785 A1 | 12/2004 | Shanmugasundaram et al. | ............. | 711/209 |
| 2005/0071536 A1 * | 3/2005 | Osborne | ............. | 711/5 |
| 2005/0081067 A1 * | 4/2005 | Sperber et al. | ............. | 713/300 |
| 2005/0114538 A1 * | 5/2005 | Rose | ............. | 709/231 |
| 2005/0198458 A1 | 9/2005 | Cho | ............. | 711/163 |
| 2006/0024541 A1 | 2/2006 | Weiss et al. | ............. | 429/22 |
| 2006/0101174 A1 * | 5/2006 | Kanamaru et al. | ............. | 710/60 |
| 2006/0179213 A1 * | 8/2006 | Brittain et al. | ............. | 711/105 |
| 2006/0179262 A1 * | 8/2006 | Brittain et al. | ............. | 711/169 |

* cited by examiner

*Primary Examiner*—Henry W. H. Tsai
*Assistant Examiner*—Tushar S Shah
(74) *Attorney, Agent, or Firm*—Meyertons, Hood, Kivlin, Kowert & Goetzel, P.C.

(57) ABSTRACT

A reordering command queue for reordering memory accesses in a computer system. The reordering command queue may reduce the power that is typically used up in computer systems when performing accesses to main memory by improving the scheduling of memory accesses with a pattern that is optimized for power and which has no (or negligible) impacting on performance. During a compare operation, the address corresponding to the command stored in each of one or more current storage locations of the reordering command queue may be compared to the address corresponding to the command stored in an adjacent storage location to determine whether the commands are in a desired order. In response to one or more of the commands not being in the desired order, a reordering operation may be performed, which may reorder each of the one or more commands from a current storage location to the adjacent storage location.

26 Claims, 6 Drawing Sheets

METHOD AND APPARATUS FOR REORDERING MEMORY ACCESSES TO REDUCE POWER CONSUMPTION IN COMPUTER SYSTEMS

BACKGROUND OF THE INVENTION

1. Field of the Invention

This invention relates to memory subsystems and, more particularly, to memory controller design.

2. Description of the Related Art

Computer systems include one or more processors that execute instructions from a memory medium. The memory medium is typically one or more levels of cache and a main memory. The main memory may be made up of one or more memory modules, e.g., Dual In-Line Memory Modules (DIMMs) or Fully-Buffered DIMMs (FB-DIMMs). A memory subsystem of a computer system typically includes a memory controller, which is connected to the main memory. The main function of the memory controller is to schedule and coordinate the execution of read and write requests (i.e., memory accesses) to main memory. The memory controller may include at least one queue to schedule the read and write requests. In most cases, the memory controller includes a queue for the read requests and a separate queue for the write requests.

Memory subsystems are typically configured to place memory modules that are not being used into a low power mode to save power. This is usually the case because in typical systems a large portion of the power dissipation is in the main memory. In most cases, memory accesses are typically executed in the order that they are received at the appropriate queue of the memory controller. The memory controller may receive several read commands in a row and each command may access a different memory module. For example, if the memory subsystem includes eight memory modules, the memory controller may receive eight read commands each accessing a different memory module. In this situation, since typical memory controllers execute the read commands in a row, the powers savings would be minimal if some of the memory modules entered into a low power mode because all the memory modules would be accessed within a short period of time. Since read and write requests are received randomly and are executed in the order they are received, the memory modules may be constantly switching from a normal power mode to a low power mode, which may result in minimal or no power savings in most situations. In some cases, the constant switching from the two different power modes may actually increase the power consumption in the system.

SUMMARY OF THE INVENTION

Various embodiments of a reordering command queue are disclosed. The reordering command queue may be comprised in a memory controller of a computer system. The computer system may also include one or more memory modules (i.e., main memory), which may be coupled to the memory controller. The reordering command queue may reduce the power that is typically used up in a computer system when performing accesses to the main memory by improving the scheduling of memory accesses with a pattern that is optimized for power and which has no (or negligible) impacting on performance.

The reordering command queue may include a plurality of storage locations, a plurality of comparators, and a plurality of reordering logic. The storage locations may store commands received at the reordering command queue in a particular order. Each of received commands may include an address corresponding to at least one of the memory modules in the system. For example, the address corresponding to each of the commands may include a memory module number and a rank number.

In one embodiment, each of the comparators of the reordering command queue may be connected between adjacent storage locations and may perform compare operations. Also, the reordering logic may be connected to each of the storage locations and may perform reorder operations. During a compare operation, each of a subset of the comparators may compare the address corresponding to the command stored in a current storage location to the address corresponding to the command stored in an adjacent storage location. In one embodiment, the comparators may compare the rank number and the memory module number of each address. The results derived from the compare operation may indicate whether the corresponding commands are in a desired order. The desired order for the commands in the reordering command queue may be from the lowest to the highest rank number and then from the lowest to the highest memory module number, i.e., the commands having the lowest rank number and then having the lowest memory module number are stored in the storage locations closer to the output of the reordering command queue. In this way, the ranks that are located physically closer to the memory controller are accessed first and all the accesses to a particular rank are grouped together to conserve power.

In response to one or more of the commands not being in the desired order, which may be determined from the results of the compare operation, the reordering logic may perform a reorder operation. During the reorder operation, each of the one or more commands that are not in the desired order may be reordered from a current storage location to an adjacent storage location. The comparators may continually perform compare operations to provide results to the reordering logic, and in response the reordering logic may reorder one or more of the commands from a current storage location to an adjacent storage location depending upon the results derived from the compare operations to improve the scheduling of memory accesses.

In one embodiment, the memory controller may include a power control unit to manage the power mode of each of the memory modules depending upon an order of the commands within the queue after one or more reorder operations to reduce power consumption in the computer system. The power control unit may change the power mode of each of the memory modules from a normal power mode to a low power mode or vice versa depending upon an order of access of the memory modules indicated by the order of the commands after one or more reorder operations.

In one embodiment, after a programmable amount of time, the reordering command queue may perform a drain operation to prevent any commands from being stuck in the reordering command queue. The drain operation may be performed with respect to one or more original commands that were stored in the reordering command queue at a time when the drain operation is started. During the drain operation, the comparators and the reordering logic may stop the compare and reorder operations with respect to the one or more original commands. If new commands are received at the reordering command queue during the drain operation, the comparators and the reordering logic may perform the compare and

Figure 1:
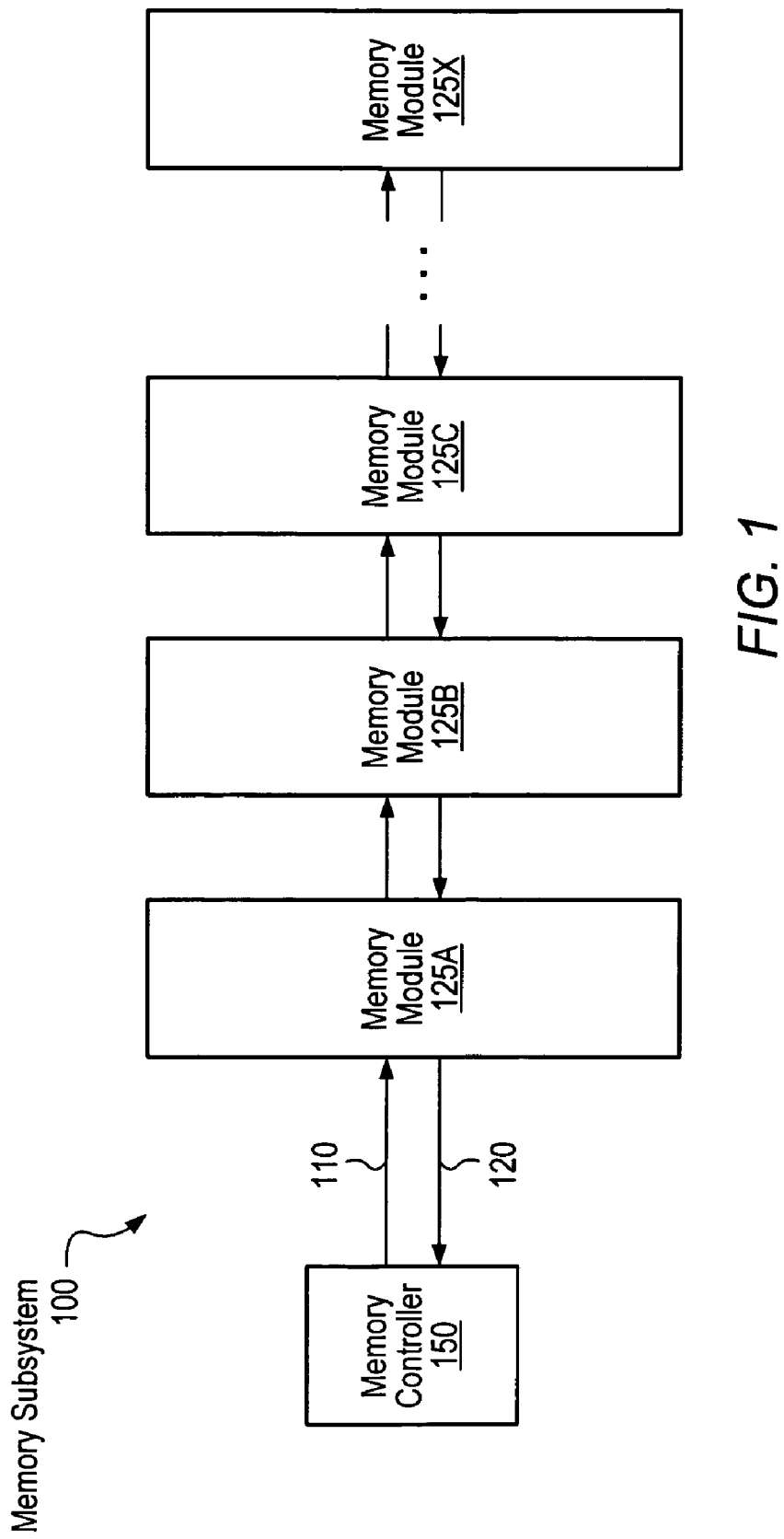
FIG. 1 is a block diagram of one embodiment of a memory subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Memory Subsystem

Turning now to FIG. 1, a block diagram of one embodiment of a memory subsystem 100 is shown. The memory subsystem 100 may be comprised in a computer system, e.g., a workstation, a personal computer, and a portable computer system, among others, as will be further described below with reference to FIG. 6. The memory subsystem 100 may include a memory controller 150 and one or more memory modules 125. For example, in the illustrated embodiments the memory subsystem 100 includes N memory modules, i.e., memory modules 125A-125X.

The memory controller 150 typically performs the scheduling of the read and writes to the memory modules 125. In the illustrated embodiment, the memory controller 150 is coupled to the memory modules 125 via two links. The link 110 may be referred to as a "downstream" or "southbound" link, since the first memory module (e.g., memory module 125A) receives data and/or commands from the memory controller 150 via the link 110. The link 120 may be referred to as an "upstream" or "northbound" link, since data is conveyed from the memory module 125A to the memory controller 150 via the link 120. The remainder of the memory modules 125 (i.e., memory modules 125B-125X) in the embodiment shown are coupled to each other through a plurality of upstream and downstream links as illustrated. In general, a link may be referred to as an upstream link if information conveyed through the link is flowing towards the memory controller 150, while a link may be referred to as a downstream link if information conveyed through the link is flowing away from the memory controller 150. In the illustrated embodiment, the memory modules 125 are coupled to each other in what is commonly referred to as a "daisy-chain" arrangement. It is noted however that in other embodiments the memory modules 125 may be coupled to each other in other arrangements.

The memory modules 125 may be configured as Dual In-Line Memory Modules (DIMMs) or Fully-Buffered DIMMs (FB-DIMMs) and may collectively form the main memory of the computer system. It is noted however that in other embodiments the memory modules 125 may have other configurations. The memory modules 125 may include memory devices in the Dynamic Random Access Memory (DRAM) family of devices. For example, a plurality of banks of Synchronous DRAM (SDRAM), Double Data Rate (DDR) SDRAM, DRR2 SDRAM, or Rambus DRAM (RDRAM) devices may be include in each of the memory modules 125. It is noted however that in other embodiments the memory modules 125 may include other types of memory devices.

The memory controller 150 may include a reordering command queue (e.g., the reordering command queue shown below in FIG. 2). The reordering command queue may reduce the power that is typically used up in a computer system when performing accesses to the main memory by improving the scheduling of memory accesses with a pattern that is optimized for power and which has no (or negligible) impacting on performance. The reordering command queue may improve the scheduling of memory accesses by reordering the commands within the reordering command queue based on rank numbers and memory module numbers, as will be further described below with reference to FIGS. 2-5.

It should be noted that the components described with reference to FIG. 1 are meant to be exemplary only, and are not intended to limit the invention to any specific set of components or configurations. For example, in various embodiments, one or more of the components described may be omitted, combined, modified, or additional components included, as desired. For instance, in one embodiment, the arrangement of the memory modules 125 may vary.

Reordering Command Queue

Figure 2:
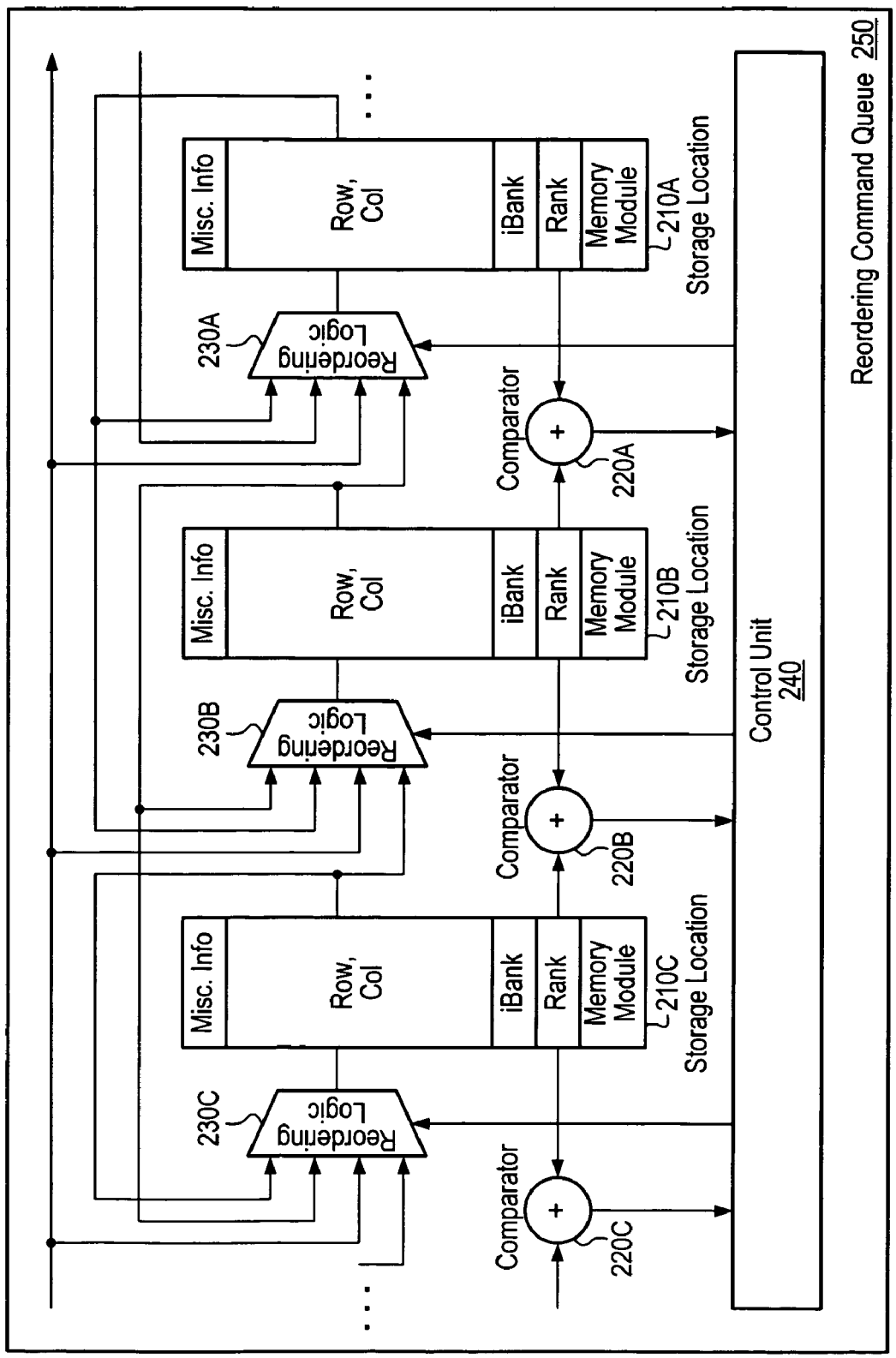
FIG. 2 is a block diagram of one embodiment of a reordering command queue.

FIG. 2 is a block diagram of one embodiment of a reordering command queue 250. The reordering command queue 250 may be comprised in an integrated circuit (IC), for example, a digital IC. In one embodiment, the IC may be an application-specific IC (ASIC). The reordering command queue 250 may be comprised in a memory controller of a memory subsystem, e.g., the memory controller 150 of the memory subsystem 100 of FIG. 1, or the reordering command queue 250 may be coupled to other components which collectively function as the memory controller of a system. It is also noted that in some embodiments the reordering command queue 250 may be included within other subsystems of a computer system. Furthermore, it is noted that in other embodiments the reordering command queue 250 may be any type of storage mechanism that includes the reordering functionality described below.

In the illustrated embodiment shown in FIG. 2, the reordering command queue 250 (e.g., the memory controller 150 of FIG. 1) includes an input line 205, a plurality of storage locations 210A-210C, a plurality of comparators 220A-220C, reordering logic 230A-230C, and control unit 240. As illustrated, the reordering command queue 250 may include any number (i.e., N) of storage locations and the corresponding comparators and reordering logic. For example, in one embodiment, the reordering command queue 250 may include eight storage locations, seven comparators, and eight reordering logic. In the illustrated embodiment, the output terminal of the reordering logic 230B is coupled to the input terminal of the storage location 210B. Also, the input line 205, the output terminal of the storage location 210C (i.e., one of the adjacent storage locations), the output terminal of the storage location 210B, and the output terminal of the storage location 210A (i.e., the other adjacent storage location) are connected to the input terminals of the reordering logic 230B. The input and output terminals of the reordering logic 230A and 230C are similarly connected. It is noted that one of the inputs to the reordering logic 230A may be connected to the output terminal of a storage location (not shown) that precedes the storage location 210A. Also, it is noted that one of the inputs to the reordering logic 230C may be connected to the output terminal of a storage location (not shown) that follows the storage location 210C. The configuration shown on FIG. 2 may continue for the rest of the reordering logic, storage locations, and comparators included within embodiments of the reordering command queue 250.

Additionally, in the illustrated embodiment, each of the plurality of comparators 220 are coupled between adjacent storage locations 210. For example, the comparator 220B is coupled between storage location 210B and storage location 210C, and the comparator 220A is coupled between the storage location 210A and the storage location 210B. Each of the comparators 210 is also coupled to the control unit 240. Furthermore, the control unit 240 is coupled to each of the reordering logic 230.

It should be noted that the components described with reference to FIG. 2 are meant to be exemplary only, and are not intended to limit the invention to any specific set of components or configurations. For example, in various embodiments, one or more of the components described may be omitted, combined, modified, or additional components included, as desired. For instance, in some embodiments, each of the reordering logic 230 may include any number of input terminals, e.g., the reordering logic 230 may include three input terminals or five input terminals. Also, in other embodiments, some of the components, e.g., the control unit 240, may be coupled to the reordering command queue 240 but may be physically located outside the IC including the queue 250.

The reordering command queue 250 may reduce the power that is typically used up in a computer system when performing accesses to the main memory without (or negligible) impacting performance. In previous design, memory accesses are typically scheduled such that different DIMMs are accessed in successive cycles or DIMMs are accessed randomly; therefore, the DIMMs typically do not switch to a low power mode or they remain in a low power mode for an insignificant amount of time. For example, in some previous designs, commands to perform memory accesses may be received in a queue and may be executed in the order they were received. Unlike previous designs, the reordering command queue 250 may reduce power consumption by improving the scheduling of memory accesses with a pattern that is optimized for power and which maintains the same level of bandwidth (performance).

In one embodiment, the reordering command queue 250 may receive commands to perform memory accesses. The reordering command queue 250 may improve the scheduling of memory accesses by reordering the commands within the queue 250 based on rank numbers and memory module (e.g., DIMM) numbers, as will be described further below. By reordering the commands within the queue 250, the memory controller (e.g., the memory controller 150 of FIG. 1) or another controlling device may predict which memory modules (e.g., FB-DIMMs) are going to be accessed next and will wake up only these memory modules, i.e., place (or maintain) the memory modules in a normal power mode. The remaining memory modules may remain (or may be placed) in a low power mode to conserve power.

Figure 3:
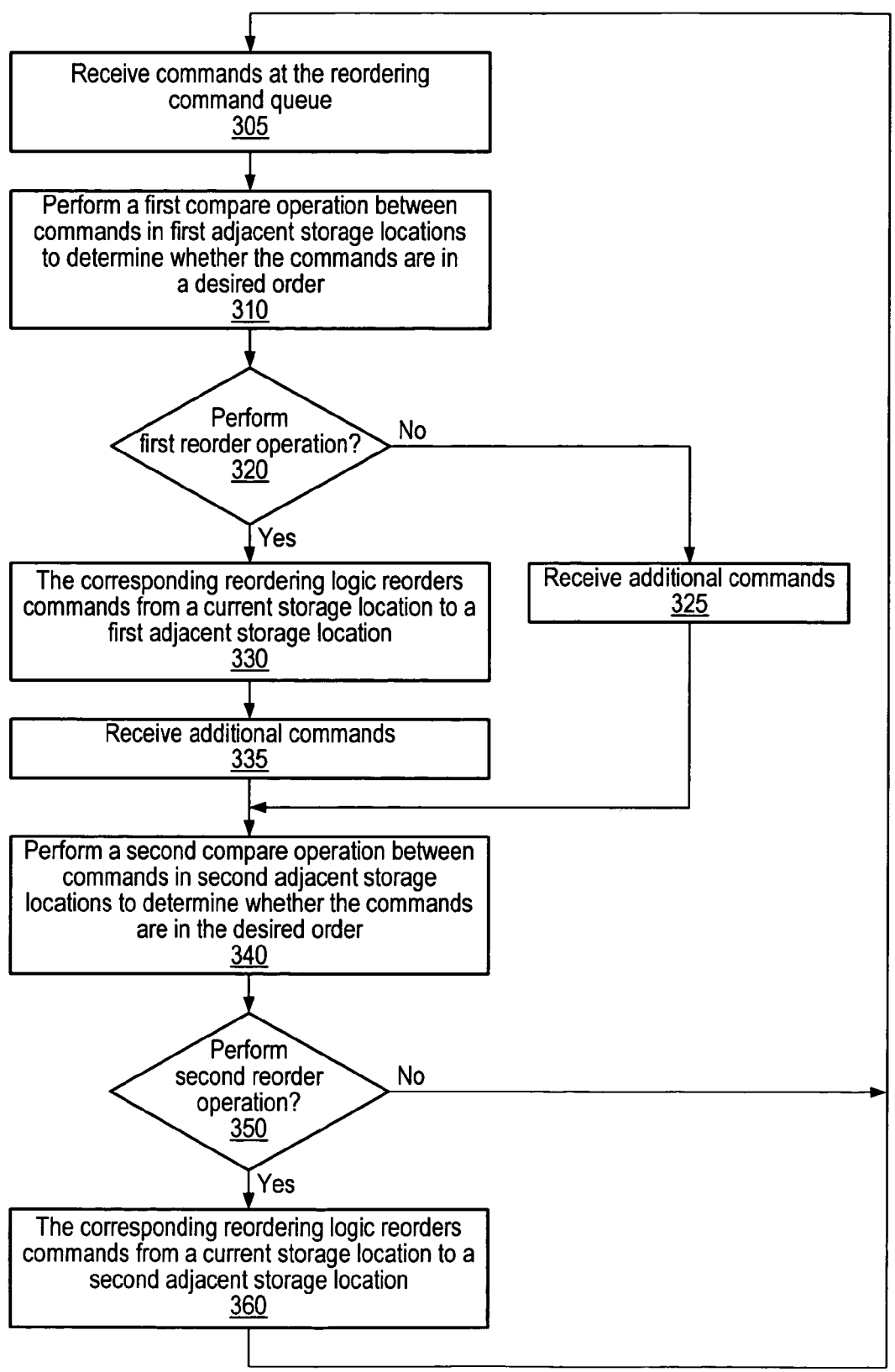
FIG. 3 is a flow diagram illustrating a method for reordering commands in the reordering command queue, according to one embodiment.

FIG. 3 is a flow diagram illustrating a method for reordering commands in the reordering command queue 250, according to one embodiment. It should be noted that in various embodiments, some of the steps shown may be performed concurrently, in a different order than shown, or omitted. Additional steps may also be performed as desired.

Referring collectively to FIG. 3 and FIG. 2, the reordering command queue 250 may receive a plurality of commands to perform memory accesses (block 305), e.g., from the memory controller (e.g., memory controller 150 of FIG. 1). As described above, in some embodiments the reordering command queue 250 may receive the commands from any type of device within any type of subsystem. The commands may be stored within one or more of the storage locations 230 in a particular order. Each of the commands may include one or more bits specifying an address corresponding to one or more of the memory modules (e.g., memory modules 125 of FIG. 1). For example, the command may include one or more bits for each of the memory module number, the rank number, the internal bank (ibank) number, and the row and column number. It is noted however that in other embodiments each of the commands may include one or more bits specifying an address corresponding to any type of device that the system is trying to access. In one embodiment, the commands may include bits for storing miscellaneous information.

The comparators 220 of the reordering command queue 250 may then perform compare operations, which may compare the address corresponding to the command stored in each of the storage locations to the address corresponding to the command stored in an adjacent storage location to determine whether the commands are in a desired order. In one embodiment, as shown in the illustrated embodiment of FIG. 4, from the direction of memory controller 150, the memory modules 125A-125X may be arranged from the lowest to the highest memory module number and, within each memory module 125, from the lowest to the highest rank number. For example, memory modules 125A-125X may be designated as memory module #0—memory module #N, respectively, and each of the memory modules 125 may include a rank #0 and a rank #1. The number designations may be based on the physical locations from the memory controller 150, i.e., the lower numbers may be given to the memory modules and ranks that are physically closer to the memory controller 150. In this embodiment, the desired order for the commands in the reordering command queue 250 is based on the corresponding memory module number and the rank number. It is noted however that in other embodiments the memory modules may be connected in other arrangements and/or other kinds of number designations may be used. For example, larger numbers may be given to the memory modules and/or ranks that are physically closer to the memory controller 150. It is also noted that in some embodiments each of the memory modules 125 may include any number of ranks, e.g., three or more ranks.

Figure 4:
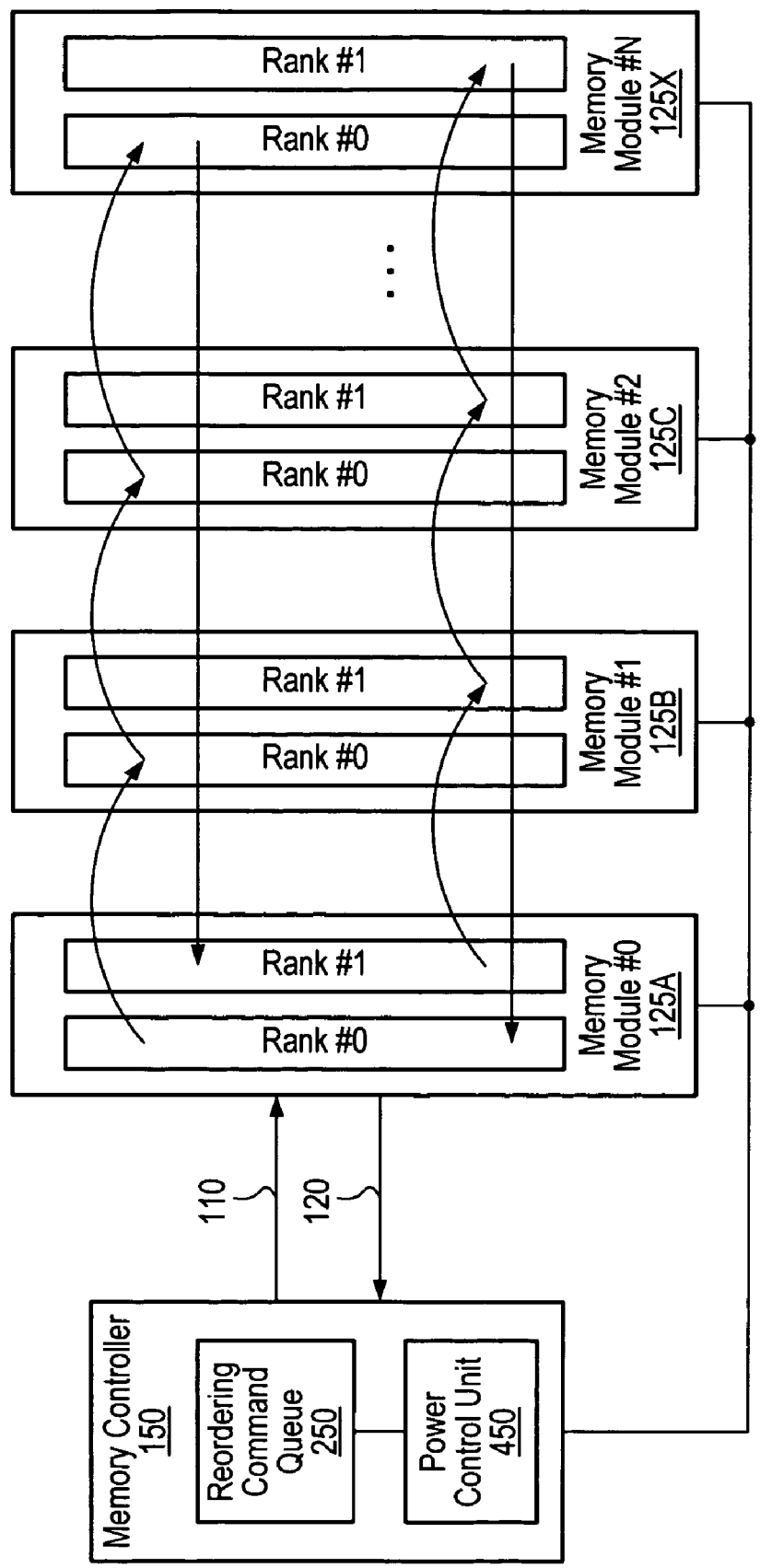
FIG. 4 is a block diagram of one embodiment of a memory subsystem.
Figure 5:
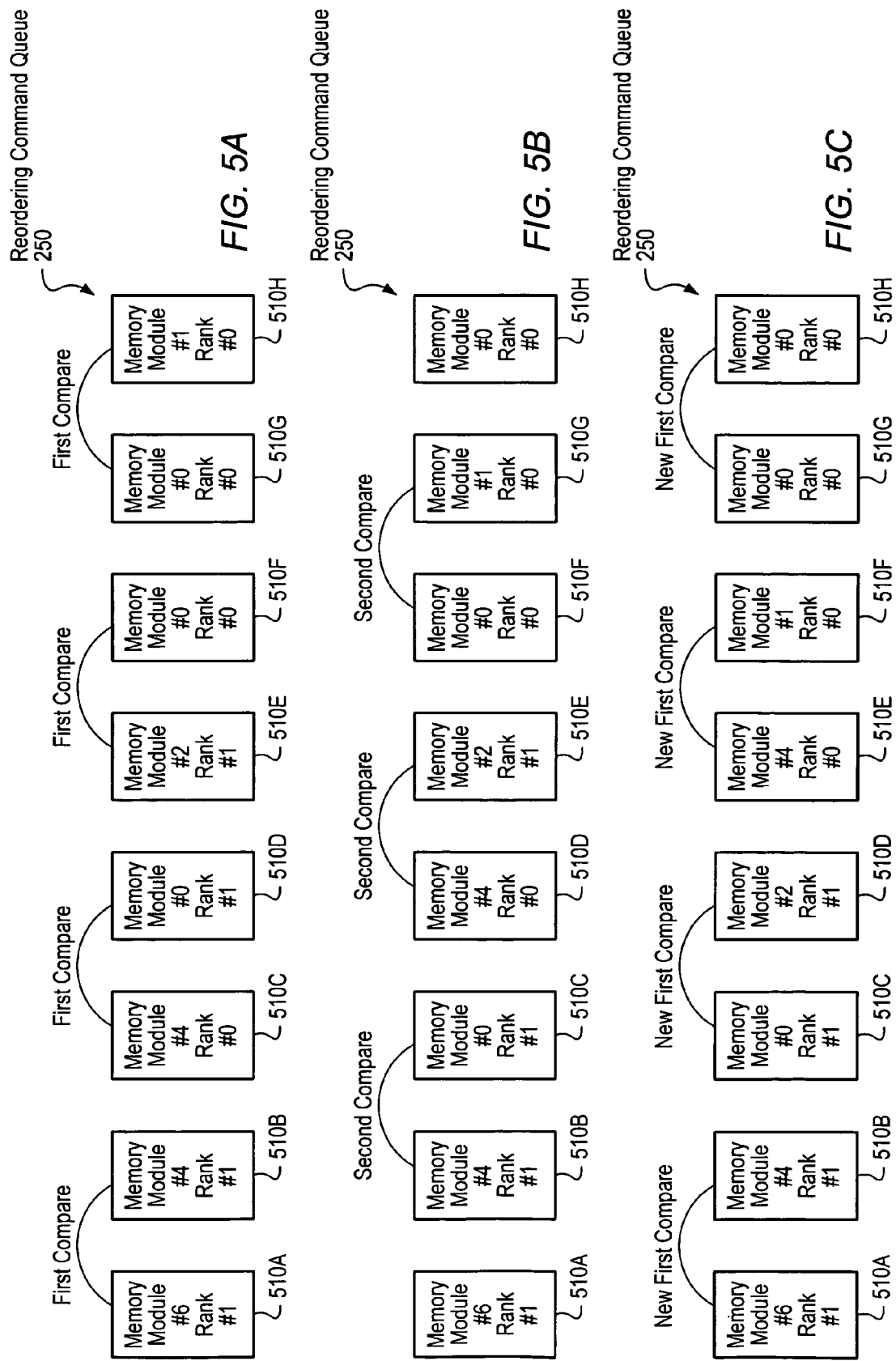
FIG. 5A is a drawing illustrating storage locations of a reordering command queue and the implementation of a first compare operation with respect to the commands stored in the storage locations, according to one embodiment.
FIG. 5B is a drawing illustrating storage locations of a reordering command queue and the implementation of a second compare operation with respect to the commands stored in the storage locations, according to one embodiment.
FIG. 5C is a drawing illustrating storage locations of a reordering command queue and the order of the commands after the first and second compare operations and the corresponding first and second reordering operations, according to one embodiment.

As shown in FIG. 4, in one embodiment the memory controller 150 may access the memory modules 125 (e.g., FB-DIMMs) in a round robin fashion. For example, the memory controller 150 may access the rank #0 of each of the memory modules in successive order starting with memory module #0, and then the memory controller 150 may access the rank #1 of each of the memory modules in successive order starting with memory module #0. In this embodiment, the desired order for the commands in the reordering command queue 250 is from the lowest to the highest rank number and then from the lowest to the highest memory module number, i.e., the commands having the lowest rank number and then having the lowest memory module number are stored in the storage locations closer to the output of the reordering command queue 250. In this way, the ranks that are located physically closer to the memory controller 150 are accessed first and all the accesses to a particular rank are grouped together to conserve power, as will be described further below. It is noted however that in other embodiments the memory controller 150 may access the memory modules 125 in different ways besides a round robin fashion.

Referring collectively to FIGS. 2-4, after receiving the commands, each of a first subset of the comparators 220 may then perform a first compare operation, which may compare the rank number and the memory module number of the address stored in each of one or more current storage locations to the rank number and the memory module number of the address stored in a first adjacent storage location to determine whether the commands are in a desired order (block 310). Then, the reordering logic 230 may perform a first reorder operation depending on the results from the first compare operation, i.e., whether the commands where in the desired order (block 320). If one or more commands are not in the desired order, the corresponding reordering logic 230 may perform a first reorder operation on these commands. It is noted that in one embodiment the desired order for the commands may be from the lowest to the highest rank number and then from the lowest to the highest memory module number, i.e., the commands having the lowest rank number and then having the lowest memory module number are stored in the storage locations closer to the output of the reordering command queue 250. In the first reorder operation, the corresponding reordering logic 230 reorders the one or more of the commands from a current storage location to the first adjacent storage location (block 330). For example, if the first compare operation performed by comparator 220A determines that the commands stored in storage locations 210A and 210B (shown in FIG. 2) are not in the desired order, the reordering logic 230A and 230B may perform a first reorder operation to swap the order of the commands stored in storage locations 210A and 210B. It is noted that one or more first reorder operations may be performed depending on the results from the one or more first compare operations. It is also noted that in some embodiments the desired order for the commands may be any order determined to save power and maintain (or improve) performance, for example, the desired order may be from the lowest to the highest memory module number.

If the results from the first compare operation indicate that all the commands are in the desired order, then a first reorder operation may not have to be performed. The reordering command queue 250 may then receive additional commands (block 325). Also, after performing the first reorder operation, the reordering command queue 250 may receive additional commands (block 335). It is noted that the reordering command queue 250 may receive additional commands at any time during the process, e.g., before or after a compare operation and/or before or after a reorder operation. It is also noted that one or more commands may be executed before the compare operation and/or reordering operation is fully completed.

Then, each of a second subset of the comparators 220 may perform a second compare operation, which may compare the rank number and the memory module number of the address stored in each of one or more current storage locations to the rank number and the memory module number of the address stored in a second adjacent storage location to determine whether the commands are in a desired order (block 340). Depending on the results from the second compare operation, i.e., whether the commands where in the desired order (block 350), the reordering logic 230 may then perform a second reorder operation. If one or more commands are not in the desired order (e.g., from the lowest to the highest rank number and then from the lowest to the highest memory module number), the corresponding reordering logic 230 may perform a second reorder operation on these commands. In the second reorder operation, the corresponding reordering logic 230 reorders the one or more of the commands from a current storage location to the second adjacent storage location (block 360). For example, if the second compare operation performed by comparator 220B determines that the commands stored in storage locations 210C and 210B (shown in FIG. 2) are not in the desired order, the reordering logic 230C and 230B may perform a second reorder operation to swap the order of the commands stored in storage locations 210C and 210B. It is noted that one or more second reorder operations may be performed depending on the results from the one or more second compare operations. After block 350 or block 360, the operation may restart and new commands may be received at the reordering command queue 250 (block 305). The comparators 220 may continually perform one compare operation after another to provide results to the reordering logic 230 and reorder the commands, especially since at any given point in time some of the commands in the queue 250 may be executed and new commands may be stored in the queue 250.

In one embodiment, the control unit 240 may receive the results from the comparators 220 after the compare operations and may control the reordering logic 230 accordingly. For example, after the first compare operation, the control unit 240 may receive the results indicating that the commands in storage locations 210A and 210B are not in the desired order. In response to receive the results, the control unit 240 may send control signals to the reordering logic 230A and 230B to select the appropriate inputs to perform the first reorder operation. In the embodiment illustrated in FIG. 2, the reordering logic 230A may select the fourth input from the top to select the output from the storage location 210B and store this command into storage location 210A. Also, the reordering logic 230B may select the second input from the top to select the output from the storage location 210A and to store this command into storage location 210B. The control unit 240 may similarly receive results from other compare operations and control the implementation of other reorder operations. It is noted that in other embodiments the functionality of the control unit 240 may be performed by other components outside of the reordering command queue 250.

FIGS. 5A-5C illustrate one example of compare and reordering operations that may be performed in one embodiment of the reordering command queue 250. In this example, as shown in FIG. 5A, the reordering command queue 250 may receive eight commands and may store the received commands in eight of its storage locations 510A-510H, which may correspond to the storage locations 210 of FIG. 2. In one embodiment, the storage location 510H may be the storage location that is physically the closest to the output of the queue 250. After storing the commands, each of a first subset of the comparators (e.g., comparators 220 of FIG. 2) may perform a first compare operation, which may compare the rank number and the memory module number of the address stored in each of the storage locations 510 to the rank number and the memory module number of the address stored in a first adjacent storage location to determine whether the commands are in a desired order. As shown in FIG. 5A, the first adjacent storage location of 510A is 510B, of 510B is 510A, of 510C is 510D, and so on. The first compare operation between storage locations 510A and 510B and the first compare operation between storage locations 510E and 510F do not result in a first reorder operation for those storage locations because these commands are in the desired order. The first compare operations between storage locations 510C and 510D and the first compare operation between storage locations 510G and 510H do result in a first reorder operation because these commands are not in the desired order. Note that the commands in storage locations 510C and 510D are swapped even though the command in 510C corresponds to a higher memory module number than 510D. The reason is because the desired order (as described above) in one embodiment may be arranging the commands from the lowest to the highest rank number and then from the lowest to the highest memory module number. In this example, storage location 510C has a lower rank number than 510D, therefore the commands switch locations during the first reorder operation.

FIG. 5B illustrates the location of the commands after the first reorder operation described in FIG. 5A. After the first reorder operation, each of a second subset of the comparators (e.g., comparators 220 of FIG. 2) may perform a second compare operation, which may compare the rank number and the memory module number of the address stored in each of one or more of the storage locations 510 to the rank number and the memory module number of the address stored in a second adjacent storage location to determine whether the commands are in the desired order. Note that in this embodiment storage locations 510A and 510H may be the storage locations at the ends of the queue 250 and therefore may not participate in the second compare operation (and a second reorder operation). It is noted however that in other embodiments the storage locations at the end of the queue 250 (e.g., 510A and 510H) may not participate in the first compare operation but may participate in the second compare operation. As shown in FIG. 5B, the second adjacent storage location of 510B is 510C, of 510C is 510B, of 510D is 510E, and so on.

FIG. 5C illustrates the location of the commands after the second reorder operation described in FIG. 5B. Note that after comparing the location of the commands shown in FIG. 5A and FIG. 5C several of the commands have swapped location during the first and second reorder operations in the examples described above. After the operations, the commands are now close to the desired order; however, the commands at storage locations 510C and 510D may still need to be swapped. The process starts again and a new first compare operation is performed. It is noted that execution of a command and/or receiving of new commands is not accounted for in the example described above. However it is noted that some of the commands illustrated in FIGS. 5A-5C (e.g., the commands at storage locations 510G and 510H) may be executed at any point during the process, and new commands may be received by the queue 250 also at any point during the process. In some cases, even though the commands stored in the queue 250 may be executed faster than the command and reordering operations may be performed and therefore the desired order may not be achieved, an improved order that is close to the desired order may be achieved.

By rearranging the commands stored within the reordering command queue 250 to the desired order or to an improved order that is close to the desired order, the memory accesses corresponding to the stored commands may be predictable since several memory accesses to a particular memory module or to a few memory modules are performed in a row. Since memory accesses may be predictable, several memory modules that will not be accessed for a particular number of cycles may be put in low power mode. Therefore, more memory modules may be placed in a lower power mode at any particular time, which may lead to improved power consumption. In the embodiment illustrated in FIG. 4, the memory controller 150 includes a power control unit 450 to manage the power mode of each of the memory modules depending upon an order of the commands within the queue 250 after one or more reorder operations. The power control unit 450 may change the power mode of each of the memory modules from a normal power mode to a low power mode or vice versa depending upon an order of access of the memory modules indicated by the order of the commands after one or more reorder operations. For example, with reference to FIG. 4, if the order of the commands indicate that the next several memory accesses are to rank #0 and to memory modules #0-2, then memory modules #3-N (or memory modules #4-N) may be placed in a low power mode. Also, since the memory accesses may be predictable, the system may also have improved wake-up/sleep scheduling. For example, when it is determined that memory modules #3-4 will be accessed in the next few cycles, only memory modules #3-4 may be switched to a normal power mode and the remaining modules #5-N may remain in a low power mode. Therefore, the reordering of commands may lead to improved power consumption without sacrificing performance. In one embodiment, the power control unit 450 may determine the order of the commands from the compare operations and/or the reordering operations.

It is noted that in other embodiments the compare operations may compare one or more of a memory module number, a rank number, an internal bank number, and a row and column number corresponding to each of the commands in the storage locations (e.g., storage locations 210). In some embodiments the reordering command queue 250 may store and reorder read commands. It is noted however that in other embodiments the reordering command queue 250 may store and reorder write commands or both read and write commands. In one embodiment, if the reordering command queue 250 is configured to store and reorder read commands, the execution of write operations may be dependent on which memory modules are turned on (e.g., in a normal power mode). For example, if during a period of time only memory modules #0-2 are turned on due to the reordering of the read commands, only the write operations corresponding to the memory modules #0-2 may be performed during that period of time.

As shown in the illustrated embodiment of FIG. 2, the control unit 240 may also control which storage location 210 receives a new command from the input line 205 of the reordering command queue 250. For example, if storage location 210C is free, the control unit 240 may send a control signal to the reordering logic 230C to select the third input from the top and store the new command. Additionally, when a comparator (e.g., comparator 220A) determines that the adjacent commands (commands stored within storage locations 230A and 230B) are in the desired order, the control unit 240 may notify the reordering logic (e.g., reordering logic 230A and reordering logic 230B) that the commands are in the desired order or the control unit 240 may do nothing. In one embodiment, if the control unit 240 sends a notification (e.g., a control signal), both the reordering logic 230A and 230B may select the first input from the top to keep the current command within the corresponding storage location. In another embodiment, if the control unit 240 sends a notification (e.g., a control signal), both the reordering logic 230A and 230B may do nothing and keep the current command within the corresponding storage location. Furthermore, the control unit 240 may be coupled to the power control unit 450 to send results from the compare and/or reordering operations so that the power control unit 450 may determine the order of the commands within the queue 250 to place certain memory modules in a normal power mode and other memory modules in a low power mode.

Due to the compare and reordering operations, the components in the reordering command queue 250 may prevent some of the commands from being executed, i.e., to perform a memory access. In other words, some commands may get stuck in the queue 250 because new commands continue to have higher priority based on the compare and reorder operations. For example, in the illustrated embodiment of FIG. 5C, the commands in storage locations 510A and 510B may get stuck in their respective storage locations for a period of time. To prevent commands from being stuck for a significant amount of time, the reordering command queue 250 may drain all the commands stored in the storage locations 210 periodically.

During a drain operation, the compare and reordering operations are stopped for the commands stored in the queue 250 at the time the drain operation is started (i.e., the original commands) and these commands are executed. Therefore, the drain operation may execute all the commands that are stuck in the queue 250. As these original commands are executed, new commands may be received and stored in the queue 250. The compare and reordering operations may be performed with respect to the new commands, even while the drain operation is being performed for the original commands. For example, there may be eight commands stored in the queue 250 when the drain operation is started. In this example, if five commands are drained and four new commands are received, the drain operation may be performed only for the three remaining original commands and the compare and reorder operations may be performed for the four new commands. In one embodiment, the original command are tagged to distinguish the original commands from any new commands that may be received and stored in the queue 250. It is noted however that in other embodiments the compare and reordering operations are stopped for all of the commands (whether original or new commands) until the drain operation is completed. The drain operation may be performed periodically at regular intervals. In one embodiment, the interval for performing the drain operation (i.e., the drain window) is programmable. It is noted however that in other embodiments the drain operation may be performed at any time, i.e., the intervals for performing the drain operation may not be regular. It is also noted that in some embodiments the queue 250 may detect whether one or more commands are stuck and in response perform drain operations.

As described above, in one embodiment the memory modules illustrated in FIG. 4 (or in FIG. 1) may be Fully-Buffered DIMMs (FB-DIMMs). Memory controllers that are used with FB-DIMMs (or other types of memory modules) may be configured to implement either fixed latency or variable latency. A fixed latency implementation is when the memory controller functions with the assumption that all memory modules have the same latency, even though the latency may vary between memory modules depending at least on the physical distance from the memory controller. A variable latency implementation is when the memory controller functions with the assumption that a memory module that is physically closer to the memory controller has less latency than a memory controller that is physically farther way.

The scheduling of memory accesses is much more complicated in a variable latency implementation because the memory controller has to account for the various latencies to avoid conflicts on the data, therefore the design of these memory controllers are typically very complex. Since the compare and reordering operations performed by components of the reordering command queue 250 make memory accesses predictable, the scheduling of memory accesses may be easier in a variable latency implementation when memory controllers that include the reordering command queue 250 are used. In other words, the reordering command queue 250 may facilitate the implementation of variable latency in memory subsystems, e.g., memory systems including FB-DIMMs. The implementation of variable latency may be further facilitated by performing memory accesses in a round robin fashion as described with reference to FIG. 4. Therefore, by using the reordering command queue 250 (as described above with reference to FIGS. 1-5), the design of the memory controller may not need to be as complex to implement a variable latency scheme.

Computer System

Figure 6:
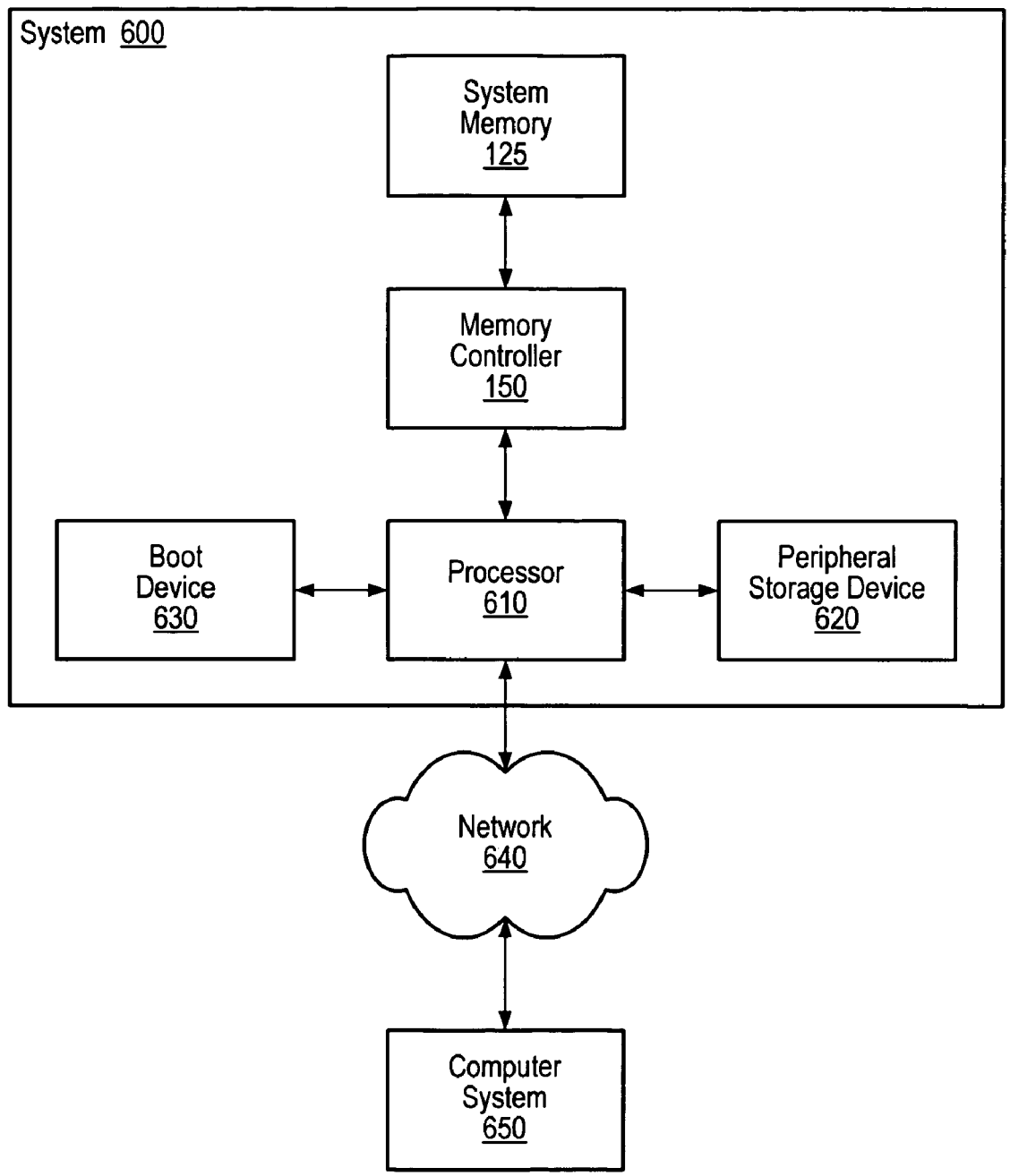
FIG. 6 is a block diagram of one embodiment of a computer system.

Turning now to FIG. 6, one embodiment of a system which incorporates a memory subsystem as described above is depicted. In the illustrated embodiment, system 600 includes a processor 610 coupled to the memory controller 150, a boot device 630, a peripheral storage device 620, and a network 640. The network 640 is in turn coupled to another computer system 650.

In some embodiments, system 600 may include more than one instance of the devices shown, such as more than one processor 610, for example. In various embodiments, system 600 may be configured as a rack-mountable server system, a standalone system, or in any other suitable form factor. In some embodiments, system 600 may be configured as a client system rather than a server system. While the memory controller 150 is depicted as a separate device, in other embodiments the memory controller 150 may be integrated with, or part of, the processor 610. In one embodiment, as described above, the memory controller 150 may include a reordering command queue (e.g., queue 250 of FIG. 2). System memory 125 may comprises memory modules (e.g., FB-DIMMs) as described above.

Peripheral storage device 620, in various embodiments, may include support for magnetic, optical, or solid-state storage media such as hard drives, optical disks, nonvolatile RAM devices, etc. In some embodiments, peripheral storage device 620 may include more complex storage devices such as disk arrays or storage area networks (SANs), which may be coupled to processor 610 via a standard Small Computer System Interface (SCSI), a Fibre Channel interface, an IEEE 1394 interface, or another suitable interface. Additionally, it is contemplated that in other embodiments, any other suitable peripheral devices may be coupled to processor 610, such as multimedia devices, graphics/display devices, standard input/output devices, etc.

Boot device 630 may include a device such as an FPGA or ASIC configured to coordinate initialization and boot of processor 610, such as from a power-on reset state. Additionally, in some embodiments boot device 630 may include a secondary computer system configured to allow access to administrative functions such as debug or test modes of processor 610.

Network 640 may include any suitable devices, media and/or protocol for interconnecting computer systems, such as wired or wireless Ethernet, for example. In various embodiments, network 640 may include local area networks (LANs), wide area networks (WANs), telecommunication networks, or other suitable types of networks. In some embodiments, computer system 650 may be similar to or identical in configuration to illustrated system 600, whereas in other embodiments, computer system 650 may be substantially differently configured. For example, computer system 650 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory subsystem comprising:
a plurality of memory modules; and
a memory controller coupled to the plurality of memory modules and configured to receive a plurality of memory access commands, wherein the memory controller includes:
a plurality of storage locations configured to store the plurality of commands, wherein each of the plurality of commands includes an address corresponding to one of the plurality of memory modules, wherein each command includes one or more bits corresponding to at least a memory module number of a corresponding memory module and a rank number of a set of storage devices within the corresponding memory module;
reordering logic configured to reorder the commands in the plurality of storage locations into a predetermined order depending upon the memory module number and the rank number; and
a power control unit configured to manage a power mode of each of the memory modules depending upon the predetermined order of the commands after one or more reorder operations to reduce power consumption in the memory subsystem.

2. The memory subsystem of claim 1, wherein the power control unit is configured to change the power mode of each of the memory modules from a normal power mode to a low power mode or vice versa depending upon an order of access of the memory modules indicated by the order of the commands after one or more reorder operations.

3. The memory subsystem of claim 1, further comprising a plurality of comparators configured to compare the address of commands stored in different storage locations to determine whether the commands are in a desired order.

4. The memory subsystem of claim 2, wherein the power control unit is further configured to place a given memory module in the low power mode in response to determining the given memory module will not be accessed based on the predetermined order of the commands.

5. The memory subsystem of claim 1, wherein:
a first plurality of comparators each coupled between adjacent storage locations and configured to compare the address corresponding to the command stored in a current storage location to the address corresponding to the command stored in an adjacent storage location; and
reordering logic coupled to each of the plurality of storage locations and configured to reorder each of one or more of the commands from the current storage location to the adjacent storage location depending upon results derived from the compare operation.

6. The memory subsystem of claim 5, wherein the address corresponding to each of the commands includes a memory module number and a rank number, wherein during a first compare operation each of the first plurality of comparators is configured to compare the rank number and the memory module number of the address stored in a current storage location to the rank number and the memory module number of the address stored in a first adjacent storage location.

7. The memory subsystem of claim 6, wherein results derived from the first compare operation indicate whether the corresponding commands are in a desired order, wherein in response to one or more of the commands not being in the desired order the reordering logic is configured to reorder each of the one or more commands from the current storage location to the first adjacent storage location.

8. The memory subsystem of claim 7, wherein each of a second plurality of comparators is then configured to compare the rank number and the memory module number of the address stored in a current storage location to the rank number and the memory module number of the address stored in a second adjacent storage location.

9. The memory subsystem of claim 8, wherein results derived from the second compare operation indicate whether the corresponding commands are in the desired order, wherein in response to one or more of the commands not being in the desired order the reordering logic is configured to reorder each of the one or more commands from the current storage location to the second adjacent storage location.

10. The memory subsystem of claim 9, wherein comparators are configured to continually perform compare operations to provide results to the reordering logic, wherein the reordering logic is configured to reorder one or more of the commands from a current storage location to an adjacent storage location depending upon the results derived from the compare operations to improve a scheduling of memory accesses to reduce power consumption in the memory subsystem.

11. The memory subsystem of claim 4, wherein the reordering logic is configured to reorder one or more of the commands based on the corresponding rank number and memory module number, wherein the reordering logic is configured to reorder the one or more commands from the lowest to the highest rank number and then from the lowest to the highest memory module number so that commands corresponding to memory modules that are physically closer to the memory controller are executed first and commands corresponding to the same memory module are executed consecutively.

12. The memory subsystem of claim 3, wherein after a programmable amount of time the memory controller is operable to drain one or more original commands that were stored in one or more of the storage locations at a time when the drain operation is started, wherein during the drain operation the comparators and the reordering logic are operable to stop the compare and reorder operations with respect to the one or more original commands.

13. The memory subsystem of claim 12, wherein, if new commands are received at one or more of the storage locations during the drain operation, one or more of the comparators and the reordering logic are operable to perform compare and reorder operations with respect to the new commands even while the drain operation is being performed with respect to the original commands.

14. The memory subsystem of claim 10, further comprising a control unit operable to receive results from each compare operation indicating whether the commands are in the desired order, wherein the control unit is operable to control a selection of an input for the reordering logic to perform the reorder operations depending upon the results derived from the compare operations.

15. A memory controller for use with a plurality of memory modules and configured to receive a plurality of memory access commands, the memory controller comprising:
 a plurality of storage locations configured to store the plurality of commands, wherein each of the plurality of commands includes an address corresponding to one of the plurality of memory modules, wherein each command includes one or more bits corresponding to at least a memory module number of a corresponding memory module and a rank number of a set of storage devices within the corresponding memory module;
 a plurality of comparators configured to compare the address of commands stored in different storage locations to determine whether the commands are in a predetermined order based upon the memory module number and the rank number;
 reordering logic configured to reorder the commands stored in the plurality of storage locations into the predetermined order depending upon whether the commands are in the predetermined order; and
 a power control unit configured to manage a power mode of each of the memory modules depending upon the predetermined order of the commands after one or more reorder operations to reduce power consumption.

16. A method for reordering commands to reduce power consumption in a memory subsystem, wherein the memory subsystem includes a memory controller and a plurality of memory modules, the method comprising:
 storing a plurality of commands in a plurality of storage locations of the memory controller, wherein each of the plurality of commands includes an address corresponding to one of the plurality of memory modules, wherein each command includes one or more bits corresponding to at least a memory module number of a corresponding memory module and a rank number of a set of storage devices within the corresponding memory module;
 reordering the commands in the plurality of storage locations into a predetermined order depending upon the memory module number and the rank number; and
 managing a power mode of each of the memory modules depending upon an order of the commands after one or more reorder operations to reduce power consumption in the memory subsystem.

17. The method of claim 16, further comprising placing a given memory module in a low power mode in response to determining the given memory module will not be accessed based on the predetermined order of the commands.

18. The method of claim 16, further comprising comparing the address of commands stored in different storage locations to determine whether the commands are in a desired order.

19. The method of claim 16, comprising:
 comparing the address corresponding to each of one or more of the commands stored in a current storage location to the address corresponding to the command stored in an adjacent storage location, and
 reordering each of the one or more of the commands from the current storage location to the adjacent storage location depending upon results derived from the compare operation.

20. The method of claim 19, further comprising performing a first compare operation to compare the rank number and the memory module number of the address stored in each of one or more current storage locations to the rank number and the memory module number of the address stored in a first adjacent storage location.

21. The method of claim 20, wherein the results derived from the first compare operation indicate whether the corresponding commands are in a desired order, wherein the method comprises performing a first reordering operation in response to one or more of the commands not being in the desired order, wherein said performing the first reordering operation includes reordering each of the one or more commands from a current storage location to the first adjacent storage location.

22. The method of claim 21, wherein the method comprises performing a second compare operation to compare the rank number and the memory module number of the address stored in each of one or more current storage locations to the rank number and the memory module number of the address stored in a second adjacent storage location.

23. The method of claim 22, wherein the results derived from the second compare operation indicate whether the corresponding commands are in the desired order, wherein the method comprises performing a second reordering operation in response to one or more of the commands not being in the desired order, wherein said performing the second reordering operation includes reordering each of the one or more commands from a current storage location to the second adjacent storage location.

24. The method of claim 18, further comprising, after a programmable amount of time, performing a drain operation with respect to one or more original commands that were stored in the memory controller at a time when the drain operation is started, wherein said performing the drain operation includes stopping the compare and reorder operations with respect to the one or more original commands and executing the one or more original commands.

25. The method of claim 24, further comprising, if new commands are received at the memory controller during the drain operation, performing the compare and reordering operations with respect to the new commands even while the drain operation is being performed with respect to the original commands.

26. A computer system comprising:
 a plurality of memory modules; and
 a memory controller coupled to the plurality of memory modules, wherein the memory controller is configured to receive a plurality of memory access commands, wherein the memory controller includes:
  a plurality of storage locations configured to store the plurality of commands, wherein each of the plurality of commands includes an address corresponding to one of the plurality of memory modules, wherein each command includes one or more bits corresponding to at least a memory module number of a corresponding memory module and a rank number of a set of storage devices within the corresponding memory module;
  a plurality of comparators configured to compare the address of commands stored in different storage locations to determine whether the commands are in a predetermined order based upon the memory module number and the rank number;

reordering logic configured to reorder the commands stored in the plurality of storage locations into the predetermined order depending upon whether the commands are in the predetermined order; and a power control unit configured to manage a power mode of each of the memory modules depending upon the predetermined order of the commands after one or more reorder operations to reduce power consumption in the computer system.

* * * * *